United States Patent
Edwards

(10) Patent No.: US 9,658,110 B1
(45) Date of Patent: May 23, 2017

(54) THERMAL SENSOR COMBINATION

(71) Applicant: Texas Instruments Incorporated, Dallas, TX (US)

(72) Inventor: Henry Litzmann Edwards, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/955,251

(22) Filed: Dec. 1, 2015

(51) Int. Cl.
- *G01J 5/00* (2006.01)
- *G01J 5/12* (2006.01)
- *G01J 5/34* (2006.01)

(52) U.S. Cl.
CPC . *G01J 5/12* (2013.01); *G01J 5/34* (2013.01); *G01J 2005/123* (2013.01); *G01J 2005/345* (2013.01)

(58) Field of Classification Search
CPC ........ H01L 2924/1461; G01J 5/12; G01J 5/34
See application file for complete search history.

(56) References Cited

U.S. PATENT DOCUMENTS

| | | | | |
|---|---|---|---|---|
| 2002/0170589 A1* | 11/2002 | Hamamoto | ............... | G01J 5/12 136/225 |
| 2004/0046123 A1* | 3/2004 | Dausch | ................ | B81B 3/0035 250/351 |
| 2008/0130710 A1* | 6/2008 | Dewes | ................... | G01K 7/028 374/179 |
| 2011/0210414 A1* | 9/2011 | Nakatani | ................... | G01J 5/02 257/467 |
| 2011/0266445 A1* | 11/2011 | Beratan | ...................... | G01J 1/02 250/338.4 |
| 2012/0319219 A1* | 12/2012 | Diamond | ............ | H04R 19/005 257/416 |

* cited by examiner

*Primary Examiner* — Kiho Kim
(74) *Attorney, Agent, or Firm* — Jacqueline J. Garner; Charles A. Brill; Frank D. Cimino

(57) ABSTRACT

A thermal sensor device using a combination of thermopile and pyroelectric sensors is disclosed. The combination is achieved in a process flow that includes ferroelectric materials, which may be used as a pyroelectric sensor, and p-poly/n-poly for thermopiles. The combination retains the sensitivity and accuracy of the thermopile sensor and speed of pyroelectric sensors. The combination provides lower noise than individual thermopile sensors and results in a higher signal-to-noise ratio.

19 Claims, 2 Drawing Sheets

THERMAL SENSOR COMBINATION

BACKGROUND

Thermal sensors operate by absorbing radiation, such as infrared energy emitted by a hot object, and converting that heat into an electric signal. These sensors are also known as bolometers. Thermal sensors can be used as single pixel detectors or may be built as a linear or rectangular array for radiation imaging. Thermal imaging arrays can detect hot objects with high pixel resolution and video frame rates. Thermal sensors such as those used to sense thermal infrared radiation for thermal imaging or thermometry typically fall into three categories: thermistors, thermopiles, and pyroelectric.

Thermistors are a type of resistors whose resistance changes with temperature significantly more than standard resistors. Thermistors are generally used as temperature sensors, self-regulating heating elements, and for other applications. Thermistor sensors are mostly accurate but have a low sensitivity and require a current bias. Thermopiles are composed of thermocouples that convert thermal energy into electrical energy. The Seebeck effect causes a voltage proportional to the temperature difference to appear across thermopiles. The temperature of thermopile thermal sensors can be read by measuring this voltage. Thermopile sensors are generally accurate and more sensitive than thermistor sensors but often are very slow due to high series resistance which combines with gate input capacitance of a measurement circuit to form a low-pass filter. Pyroelectric sensors based on pyro-electricity concept. Certain pyroelectric minerals and crystals create electric charge when they are subject to temperature change. Pyroelectric sensors are fast and sensitive but generally inaccurate because the pyroelectric crystals exhibit leakage and hysteresis which corrupts their stored charge. Pyroelectric sensors cannot be used for thermal imaging due to image fade and ghosting effects.

SUMMARY

In accordance with an embodiment a microelectronic device is provided. The microelectronic device comprises a heat sensing layer formed in a semiconductor substrate, the heat sensing layer includes an array of thermopile elements and an array of pyroelectric elements. A thermal isolation membrane formed underneath the heat sensing layer, a heat absorbing layer formed over the heat sensing layer, and a heat sink coupled to the semiconductor substrate. A first end of each one of the thermopile elements is thermally coupled to the heat absorbing layer and thermally isolated from the heat sink by the thermal isolation membrane, and a second end of each one of the thermopile elements is thermally coupled to the heat sink and thermally isolated from the heat absorbing layer by the thermal isolation membrane.

In accordance with some embodiment, a radiant energy sensing device is provided. The radiant energy sensing device is formed on a semiconductor substrate and includes a heat absorber, a heat sensor thermally coupled to the heat absorber and comprising an array of thermopile elements and an array of pyroelectric elements, a thermal isolation element coupled to the heat sensor, and a heat sink coupled to the semiconductor substrate. A first end of each one of the thermopile elements is thermally coupled to the heat absorber and thermally isolated from the heat sink by the thermal isolation element, and a second end of each one of the thermopile elements is thermally coupled to the heat sink and thermally isolated from the heat absorber by the thermal isolation element.

In accordance with some embodiment, a semiconductor thermal sensor is provided. The thermal sensor includes a heat absorber, a heat sensor thermally coupled to the heat absorber and comprising an array of thermopile elements and an array of pyroelectric elements, a thermal isolation element coupled to the heat sensor, and a heat sink coupled to the thermal sensor. A first end of each one of the thermopile elements is thermally coupled to the heat absorber and thermally isolated from the heat sink by the thermal isolation element, a second end of each one of the thermopile elements is thermally coupled to the heat sink and thermally isolated from the heat absorber by the thermal isolation element, and a temperature response coefficient of the thermopile array is substantially same as a temperature response coefficient of the pyroelectric array.

DETAILED DESCRIPTION

The following description provides many different embodiments, or examples, for implementing different features of the subject matter. These descriptions are merely for illustrative purposes and do not limit the scope of the invention.

According to some embodiments, a combination of thermopile and pyroelectric sensors is disclosed. Such a combination can be achieved in a process flow that includes ferroelectric materials, which may be used as a pyroelectric sensor, and p-poly/n-poly for thermopiles. These sensors can be combined in various different combinations such as parallel, series, or a combination thereof.

Figure 1:
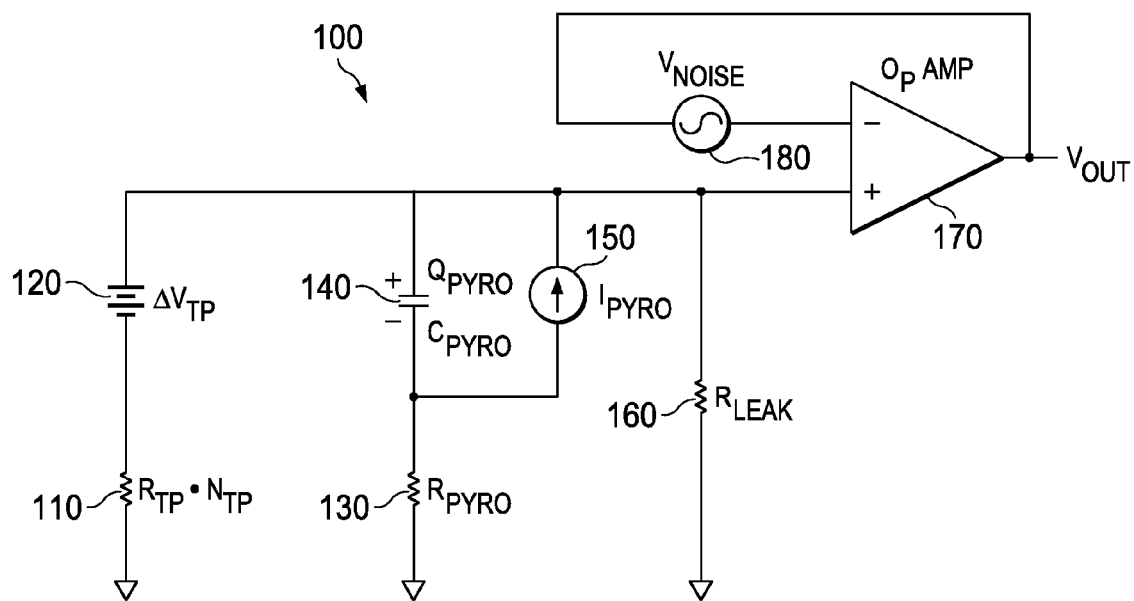
FIG. 1 is an exemplary schematic 100 for a combination of thermopile and pyroelectric sensors according to some embodiment.

Referring to FIG. 1, an exemplary circuit schematic 100 for a combination of thermopile and pyroelectric sensors is shown according to some embodiment. In the present example, a parallel combination is shown; however, other combinations can be used to achieve similar results. Circuit 100 includes a combination of resistors $R_{TP}$ 110 representing reflecting the resistance of a thermopile array including a number of thermopiles ($N_{TP}$). The amount of resistance depends upon the number $N_{TP}$ of thermopiles used, in series or parallel. In the present example, $N_{TP}$ thermopiles are used in series thus the total resistance of thermopiles will be $N_{TP}*R_{TP}$. Based on the temperature exposure, a voltage $\Delta V_{TP}$ 120 is developed across thermopiles. An array of pyroelectric sensor elements $R_{PYRO}$ 130 is electrically connected to thermopile array 110 in parallel. In the exemplary embodiment, Pyroelectric sensors perform similar functions as capacitors. When pyroelectric sensors are subject to a temperature change then over a period of time, a charge $Q_{PYRO}$ is stored across each end of the pyroelectric capacitor 140 with a capacitance of $C_{PYRO}$ and leakage resistance of $R_{LEAK}$ 160. Pyroelectric capacitors generate leakage current $I_{PYRO}$ 150. $I_{PYRO}=(d/dt) Q_{PYRO}$ and related to pyroelectric coefficient. An Op Amp 170 with appropriate feedback loop

180 is connected to the sensor combination. The voltage $V_{OUT}$ generated across sensors can be measured using the Op Amp 170. This voltage reflects the temperature change across sensors.

Pyroelectric sensors are faster than thermoelectric sensors and more sensitive to changes. A pyroelectric sensor is a self-charging capacitor. An open-circuit ideal pyroelectric sensor behaves like a battery as the pyroelectric current charges its capacitance. There are two resistors—resistance in the pyroelectric capacitor electrodes $R_{PYRO}$ 130 and a leakage resistance $R_{LEAK}$ 160 through the pyroelectric film. The pyroelectric sensor can exhibit low-pass behavior and signal fading. The pyroelectric crystal of sensors also exhibits a memory cell; however, the amount of charge on the pyroelectric sensor capacitor is not determined by the equivalent circuit. So the pyroelectric sensor can also exhibit hysteresis. The feedback mechanism $V_{NOISE}$ 180 provided by the thermopiles 120 stabilizes the voltage across the pyroelectric sensor capacitor to near its ideal value and the speed and change sensitivity of the pyroelectric sensors can be preserved while the stability and image accuracy can be recovered.

The circuit analysis of the circuit combination of FIG. 1 is shown as follows:
For Pyroelectric:

$$I_{PYRO} = C_{PYRO} * (\alpha_{PYRO} * h / \in * \in_0) * (d\Delta T_{PYRO}/dt)$$

Where $\in$ is relative permittivity, $\in_0$ is permittivity of free space, and 'h' is thickness of pyroelectric layer in a given semiconductor arrangement.

$$\text{Pyroelectric coefficient } B_{PYRO} = (\alpha_{PYRO} * h / \in * \in_0)$$

Thus, $$I_{PYRO} = B_{PYRO} * C_{PYRO} * (d\Delta T_{PYRO}/dt)$$

For Thermopile:

$$\Delta V_{TP} = N_{TP} * \alpha_{pn} * \Delta T_{TP}$$

Where $\alpha_{pn}$ is Seebeck coefficient of thermopile and $\Delta T_{TP}$ is change in temperature across thermopile.
Thermopile coefficient is given as $B_{TP} = N_{TP} * \alpha_{pn}$
Thus, $$\Delta V_{TP} = B_{TP} * \Delta T_{TP}$$

Analyzing the equivalent circuit combination further, it can be shown that coefficient of thermopile $B_{TP}$ and of pyroelectric $B_{PYRO}$ can be made equal by choosing the appropriate number of thermopiles stacked in series. The number of thermopiles for achieving this can be determined as follows:
The objective is to have a design choice with $\Delta V_{TP} = \Delta V_{PYRO}$
Where:

$$\Delta V_{PYRO} = (\alpha_{PYRO} * h / \in * \in_0) \Delta T_{PYRO}; \text{ and}$$

$$\Delta V_{TP} = N_{TP} * \alpha_{pn} * \Delta T_{TP} * \xi,$$

where $\xi$ is thermal coupling efficiency of thermopiles.
Therefore:

$$(\alpha_{PYRO} * h / \in * \in_0) \Delta T_{PYRO} = N_{TP} * \alpha_{pn} * \Delta T_{TP} * \xi$$

Per the design objective, $\Delta V_{TP} = \Delta V_{PYRO}$, which means $\Delta T_{TP} = \Delta T_{PYRO}$ $$=> (\alpha_{PYRO} * h / \in * \in_0) = N_{TP} * \alpha_{pn} * \xi$$

$$=> N_{TP} = (\alpha_{PYRO} * h / \in * \in_0) * (1 / \alpha_{pn} * \xi)$$

As shown above, by selecting the appropriate thickness of pyroelectric layer on a given semiconductor arrangement, the number of thermopiles in the combination can be determined. The number of thermopile $N_{TP}$ calculated by $\Delta V_{TP} = \Delta V_{PYRO}$, results in similar or substantially similar temperature response coefficients of thermopile array $\Delta V_{TP}$ and Pyroelectric $\Delta V_{PYRO}$. In some cases, it may be desirable to stack the pyroelectric elements in series to multiply the pyroelectric voltage, using a similar matching criterion to that described above for thermopile stacking Thus a combination of series and parallel stacking may be used in the array of pyroelectric elements just as it is used in the thermopile array. This may be helpful in matching thermal responsivity of the thermopile array to that of the pyroelectric array. It also provides the ability to adjust the overall responsivity of the sensor to a desired value. This results in pyroelectric and the thermopile exhibiting the same voltage response to temperature. This is because the thermopile acts as a voltage source through the Seebeck effect and a pyroelectric can be viewed as a self-charging capacitor. The parallel combination of thermopile and pyroelectric of FIG. 1 can provided many advantages. First, it retains the sensitivity and accuracy of the thermopile sensor. Second, it retains the speed of pyroelectric sensors and finally, the sensor combination has much lower noise than individual thermopile sensors and results in a higher signal-to-noise ratio. The large capacitance of the pyroelectric sensors averages out the Johnson noise fluctuations, which can be generated by the thermal agitation of the charge carriers in these sensors. In an embodiment, the combination of sensors is combined spatially in a cavity sensor type of semiconductor configuration.

Figure 2:
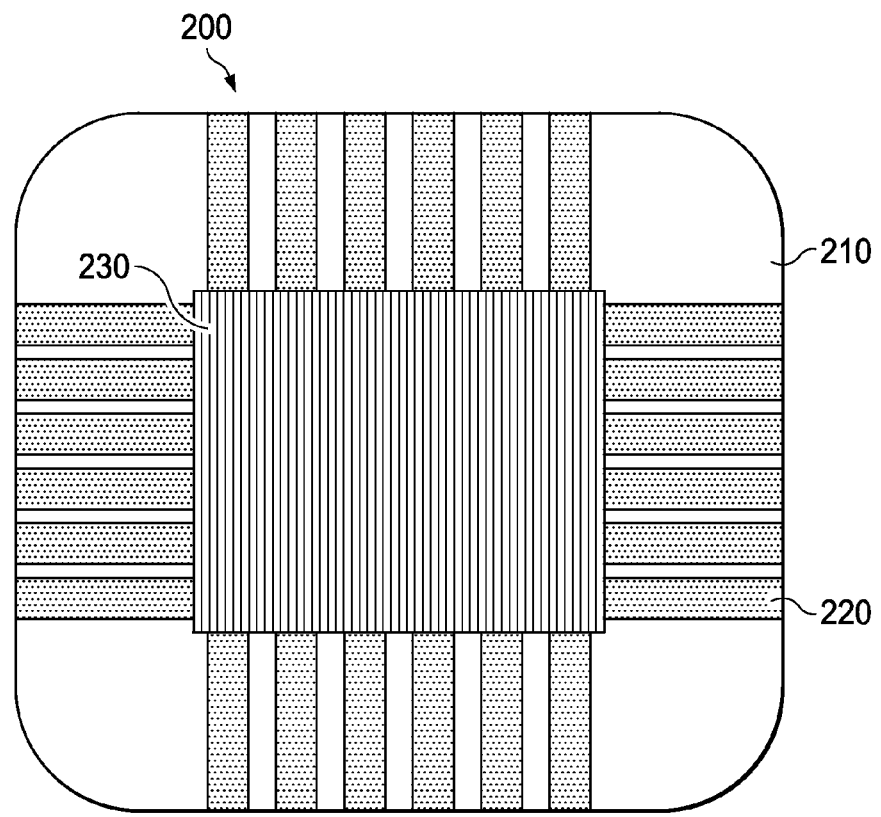
FIG. 2 illustrates an exemplary cavity sensor type semiconductor configuration 200 according to some embodiment.

Referring to FIG. 2, the top view of an exemplary cavity sensor type semiconductor configuration 200 is illustrated according to an embodiment. The sensor configuration 200 includes a substrate 210, a poly thermopiles sensor array 220, and a pyroelectric sensor capacitor array 230. A dielectric isolation membrane (not shown) is formed by etching the silicon substrate 200 underneath sensors 220 and 230, allowing thermal isolation of elements fabricated within it. This improves the thermal isolation. Typically the membrane dimensions can be 100 um or more. Alternatively thermal isolation may be achieved in various different ways, such as using a release etch to release the structure, minimizing conductive heat loss effects in the semiconductor. According to an embodiment, Poly thermopile sensor array 220 and pyroelectric sensors 230 are electrically connected in a configuration similar to illustrated in FIG. 1. A semiconductor thermal absorption layer (not shown) made of thermal absorptive material may be deposited over the sensor arrangement In the present example, the poly thermopiles 220 are arrayed at the edge of the semiconductor substrate 200 such that they capture the maximum temperature gradient. Infrared energy is absorbed in the semiconductor thermal absorption membrane, causing the center of the membrane to become hotter than the edges. The thermopile array 220 can be configured such that each has one end at the cavity edge, which can be used as the 'cold junction' and an edge in the interior of the semiconductor membrane over the cavity, which can be used as the 'hot junction'. The array can be configured using size depending on the number of thermopiles needed. In an embodiment, thermopiles can be of 0.2 um allowing to use the maximum number of thermopile sensors in a given configuration. The dielectric thermal isolation membrane layer can also be configured such to preserve thermal isolation of these sensors. Thermopile array 220 can be configured using polysilicon or poly silicon germanium, which can be deposited as SiGe or Ge-implanted polysilicon on the semiconductor substrate 210.

As illustrated in FIG. 2, thermopiles 220 run substantially radially from the edge towards the middle of the membrane so that they can experience the most temperature difference along their length. Depending on the size and shape of silicon substrate, poly thermopile array 220 can be structured in many different forms to capture maximum temperature gradient. Further, these thermopile can be arranged in parallel or series combination and may comprise series-connected pairs of n-type and p-type polysilicon. Electrically, the pyroelectric and thermoelectric sensors can be in a parallel combination. According to some embodiment, the pyroelectric sensors 230 are configured using ferroelectric isolation capacitors based on an embedded ferroelectric random access memory cell structure for example, using the process described in U.S. Pat. Nos. 6,225,655; 6,362,499; and 6,548,343 assigned to the assignee of the present application and their description is incorporated herein by reference in its entirety for all purposes. The ferroelectric capacitors can be arranged mostly in the middle region of the semiconductor substrate membrane 210 so they can be sensitive to the strongest temperature deviations of the semiconductor membrane. The pyroelectric capacitors can be arranged in individual series or parallel combination or a series-parallel combination. The series configurations increase the sensitivity and the parallel configuration increases the current drive capability of sensors. An optional metal or similar heat absorption grating can be placed on top the pyroelectric sensors 230 to increase the heat absorption capability of sensors. Further, a series/parallel combination of thermopiles and a series/parallel combination of pyroelectric elements may be used if needed to match the temperature coefficients while maximizing the use of membrane area for sensor elements.

When a temperature gradient $\Delta T$ develops, pyroelectric crystals of pyroelectric sensors 230 undergo a thermal expansion, and through its piezoelectric coefficient, each unit cell's polarization changes. This results in charge being deposited on the capacitor plates, which forms a voltage across the pyroelectric element. As stated hereinabove, the temperature gradient $\Delta T$ across the poly thermopiles 220 causes a voltage difference $\Delta V$ to develop through the Seebeck effect $\Delta V = \alpha \Delta T$, where a is the Seebeck coefficient of poly thermopiles. Thermopiles 220 respond to $\Delta T$ and pyroelectric sensors 230 respond to dT/dt. Pyroelectric sensors 230 charge their capacitance to $\Delta V$ voltage. A change in infrared signal causes a current spike in pyroelectric sensors 230 as it tries to adjust its capacitance. Thermopile sensors on the other hand provide a "battery" at the same voltage to pyroelectric sensors 230. This reduces the charge drift in pyroelectric capacitors due to the leakage. Pyroelectric capacitors provide a "hold" function similar to a sample-and-hold circuit of an analog-to-digital converter by capturing the $\Delta V$ voltage in response to dT/dt.

The number of thermopiles $N_{TP}$ can be chosen such that the pyroelectric sensors and thermoelectric sensors produce the same voltage response to the temperature change $\Delta T$. In that case, the output voltages of these sensors increase together and the charge produces is not exchanged among sensors. The combination of thermopile and pyroelectric sensors produces same sensitivity as each of the individual sensor. The circuit combination of FIG. 1 can be realized by using appropriate number $N_{TP}$ of thermopile sensors connected in parallel to match pyro sensitivity of pyroelectric sensors with a feedback mechanism to stabilize the pyroelectric sensors as described hereinabove. In an exemplary embodiment, considering the signal expressions of both thermopile and pyroelectric sensors and making certain assumptions about materials parameters, the optimal number of thermopile sensors per pyroelectric element were calculated in the range 20-200.

Figure 3:
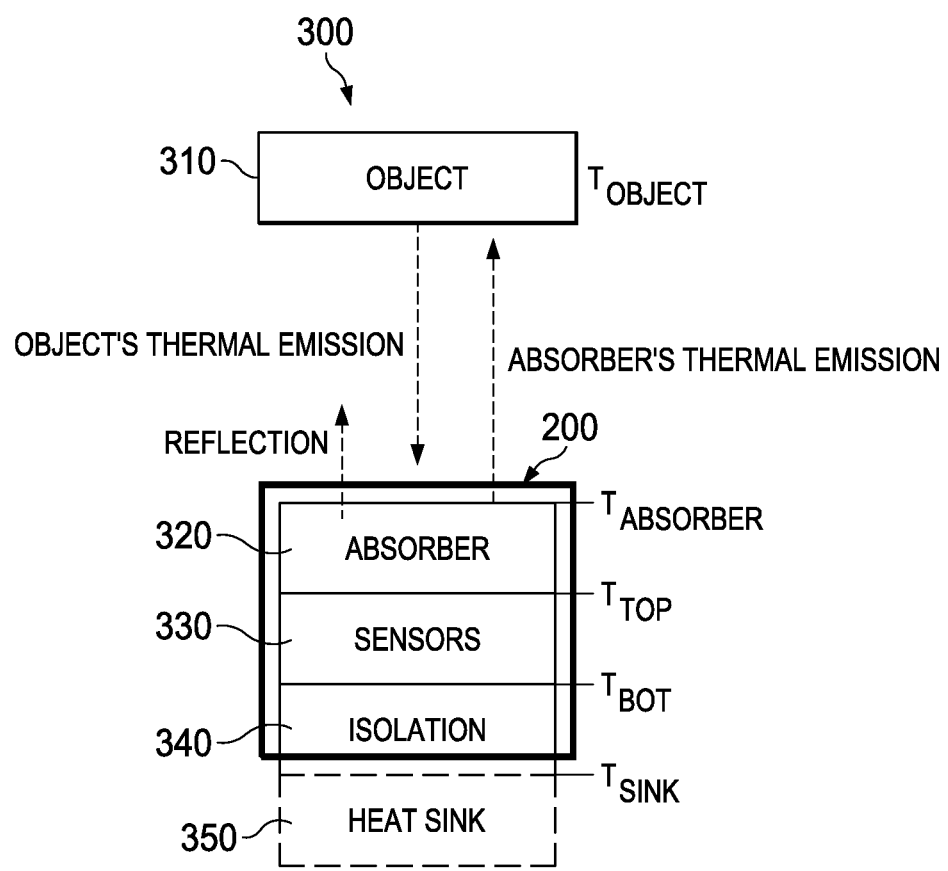
FIG. 3 illustrates an exemplary block diagram of a sensor device according to some embodiment.

Referring to FIG. 3, an exemplary cross-sectional illustration of semiconductor configuration of sensor 200 according to some embodiment. System 300 includes an object 310 and a Sensor device 200. Object 310 can be any object emitting heat and/or infrared radiation (IR) (thermal emission) such as human body, electronic circuit, or any other similar object capable of generating heat and IR radiation with a thermal temperature of $T_{object}$. The Sensor device 200 can be fabricated on a semiconductor substrate using the ferroelectric memory cell described hereinabove. Sensor device 200 includes an Absorber 320, Sensors 330, an Isolation layer 340 and a Heat sink 350. The thermal emission from Object 310 is absorbed by Absorber 320. Absorber 320 can be any material capable of absorbing heat such as metals with high thermal absorption coefficient such as silicon dioxide, silicon nitride, polysilicon, ferroelectric material, and packaging related materials such as polyimide, PBO, epoxy or mold compound and the like that are well known in the art. Small metal structures (dimensions smaller than the wavelength of the IR of interest) can also be used as absorbers even though large sheets of metal make good IR mirrors. Absorber 320 also emits heats and reflects some of the heat that impinges upon its surface from Object 310. Absorber 320 is thermally connected to Sensors 330. Poly thermopiles absorb IR radiation; however, optionally additional absorbing layer can be added to improve the heat absorption. In an embodiment, the nitride PO or a $SiO_2$ layer above (and encasing) the thermopile and pyro sensor elements is used to improve heat absorption of the Absorber 320.

In an embodiment, Sensors 330 are thermally isolated from Heat sink 350 by Isolation layer 340. Isolation layer 340 thermally can be configure using various etching processes such as release-etch process, reflective ion etch (RIE) process and the like known in the art. Release-etch process uses an aqueous etching mechanism utilizing hydrofluoric acid (HF) vapor etching to remove silicon dioxide from the semiconductor substrate. RIE process uses chemically reactive plasma to remove material deposited on semiconductor wafers. Typically, the plasma is generated under low pressure (vacuum) by an electromagnetic field and high-energy ions from the plasma attack the wafer surface and react with it for etching.

In an embodiment, the Isolation 340 is configured using a bulk Silicon (Si) etch where dielectrics above the Si substrate are left as a membrane with poly thermopile gates, metal traces, thin film resistors, vias, and other elements remain trapped inside. In an embodiment, Sensor 330 unit is configured similar to the configuration 200 illustrated in FIG. 2 with arrays of thermopile sensors 220 and pyroelectric sensor grid 230 where the a 'hot end' of each of the thermopile array is thermally connected to Absorber 320 and thermally isolated from Heat sink 350 by Isolation 340 and a 'cold end' of thermopile array is connected to Heat sink 350 and thermally isolated from Absorber 320 by Isolation 340.

When Absorber 320 is subject to IR emission form hot Object 310, Absorber 320 absorbs net heat minus Absorber's emissions and reflection losses and develops a temperature $T_{absorber}$. Absorber 320's temperature increases, activating a response in Sensor 330 and Sensors 330 "Sees" the temperature $T_{object}$ of Object 310. Sensors 330 develop a temperature $T_{top}$ at the 'hot end' connected to Absorber 320, which will be different from temperature $T_{bot}$ of its 'cold end" that is connected to Heat sink 350. Ideally, for poly thermopile sensors ΔT, $T_{top}=T_{object}$; and $T_{bot}=T_{object}$; and $T_{bot}=T_{sink}$ and the absolute temperature T for both types of sensors will be $T_{top}=T_{bot}=T_{object}$. The sensor 200 can be configured to measure temperature in various different applications including but not limited to environmental control electronics, automotive, electronic devices and the like.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A microelectronic device comprising:
   a heat sensing layer formed in a semiconductor substrate, the heat sensing layer comprising an array of thermopile elements arranged around an array of pyroelectric elements;
   a thermal isolation membrane formed underneath the heat sensing layer;
   a heat absorbing layer formed over the heat sensing layer; and
   a heat sink coupled to the semiconductor substrate,
   wherein a first end of each one of the thermopile elements is thermally coupled to the heat absorbing layer and thermally isolated from the heat sink by the thermal isolation membrane, and
   a second end of each one of the thermopile elements is thermally coupled to the heat sink and thermally isolated from the heat absorbing layer by the thermal isolation membrane.

2. The micro electric device of claim 1, wherein the pyroelectric array is thermally coupled to the heat absorbing layer and thermally isolated from the heat sink by the thermal isolation membrane.

3. The microelectronic device of claim 1, wherein the thermal isolation membrane is formed on the semiconductor substrate using one or more of hydrofluoric acid (HF) vapor etching and reactive-ion etching.

4. The microelectronic device of claim 1, wherein the pyroelectric elements are ferroelectric isolation capacitors.

5. A microelectronic device comprising:
   a heat sensing layer formed in a semiconductor substrate, the heat sensing layer comprising an array of thermopile elements and an array of pyroelectric elements;
   a thermal isolation membrane formed underneath the heat sensing layer;
   a heat absorbing layer formed over the heat sensing layer; and
   a heat sink coupled to the semiconductor substrate,
   wherein a first end of each one of the thermopile elements is thermally coupled to the heat absorbing layer and thermally isolated from the heat sink by the thermal isolation membrane, and
   a second end of each one of the thermopile elements is thermally coupled to the heat sink and thermally isolated from the heat absorbing layer by the thermal isolation membrane, wherein a temperature response coefficient of the thermopile array is substantially similar to a temperature response coefficient of the pyroelectric array.

6. The microelectronic device of claim 1, wherein the thermopile array and the pyroelectric array are electrically coupled in parallel.

7. The microelectronic device of claim 1, wherein the thermopile array is selected from a group of materials consisting of polysilicon, poly silicon germanium, and a combination thereof.

8. A radiant energy sensing device formed on a semiconductor substrate, comprising:
   a heat absorber;
   a heat sensor thermally coupled to the heat absorber and comprising an array of thermopile elements and an array of pyroelectric elements wherein thermopiles of the array of thermopiles each extend from an edge of the semiconductor substrate to an interior region adjacent the array of pyroelectric elements;
   a thermal isolation element coupled to the heat sensor; and
   a heat sink coupled to the semiconductor substrate,
   wherein a first end of each one of the thermopile elements is thermally coupled to the heat absorber and thermally isolated from the heat sink by the thermal isolation element, and
   a second end of each one of the thermopile elements is thermally coupled to the heat sink and thermally isolated from the heat absorber by the thermal isolation element.

9. The radiant energy sensing device of claim 8, wherein the thermopile array and the pyroelectric array are electrically coupled in parallel.

10. The radiant energy sensing device of claim 8, wherein the pyroelectric array is thermally coupled to the heat absorber and thermally isolated from the heat sink by the thermal isolation element.

11. The radiant energy sensing device of claim 8, wherein the thermopile array is selected from a group of materials consisting of polysilicon, poly silicon germanium, and combination thereof.

12. The radiant energy sensing device of claim 8, wherein the thermal isolation element is formed on the semiconductor substrate using one or more of hydrofluoric acid (HF) vapor etching and reactive-ion etching.

13. The radiant energy sensing device of claim 8, wherein the pyroelectric elements are ferroelectric isolation capacitors.

14. The radiant energy sensing device of claim 8, wherein the thermopiles elements are electrically connected in series.

15. The radiant energy sensing device of claim 8, wherein the pyroelectric elements arranged electrically in a series-parallel combination.

16. The radiant energy sensing device of claim 8, wherein a temperature response coefficient of the thermopile array is substantially similar to a temperature response coefficient of the pyroelectric array.

17. A semiconductor thermal sensor, comprising:
a heat absorber;
a heat sensor thermally coupled to the heat absorber and comprising an array of thermopile elements and an array of pyroelectric elements;
a thermal isolation element coupled to the heat sensor; and
a heat sink coupled to the thermal sensor,
wherein a first end of each one of the thermopile elements is thermally coupled to the heat absorber and thermally isolated from the heat sink by the thermal isolation element,
a second end of each one of the thermopile elements is thermally coupled to the heat sink and thermally isolated from the heat absorber by the thermal isolation element, and
a temperature response coefficient of the thermopile array is substantially similar to a temperature response coefficient of the pyroelectric array.

18. The semiconductor thermal sensor of claim 17, wherein the pyroelectric array is thermally coupled to the heat absorber and thermally isolated from the heat sink by the thermal isolation element.

19. The semiconductor thermal sensor of claim 17, wherein
the thermopile array is selected from a group of materials consisting of polysilicon, poly silicon germanium, and combination thereof, and
the pyroelectric elements are ferroelectric isolation capacitors.

* * * * *